Sept. 4, 1945.  G. M. MAGRUM ET AL  2,384,186
HYDRAULIC SHOCK ABSORBER
Filed April 10, 1942
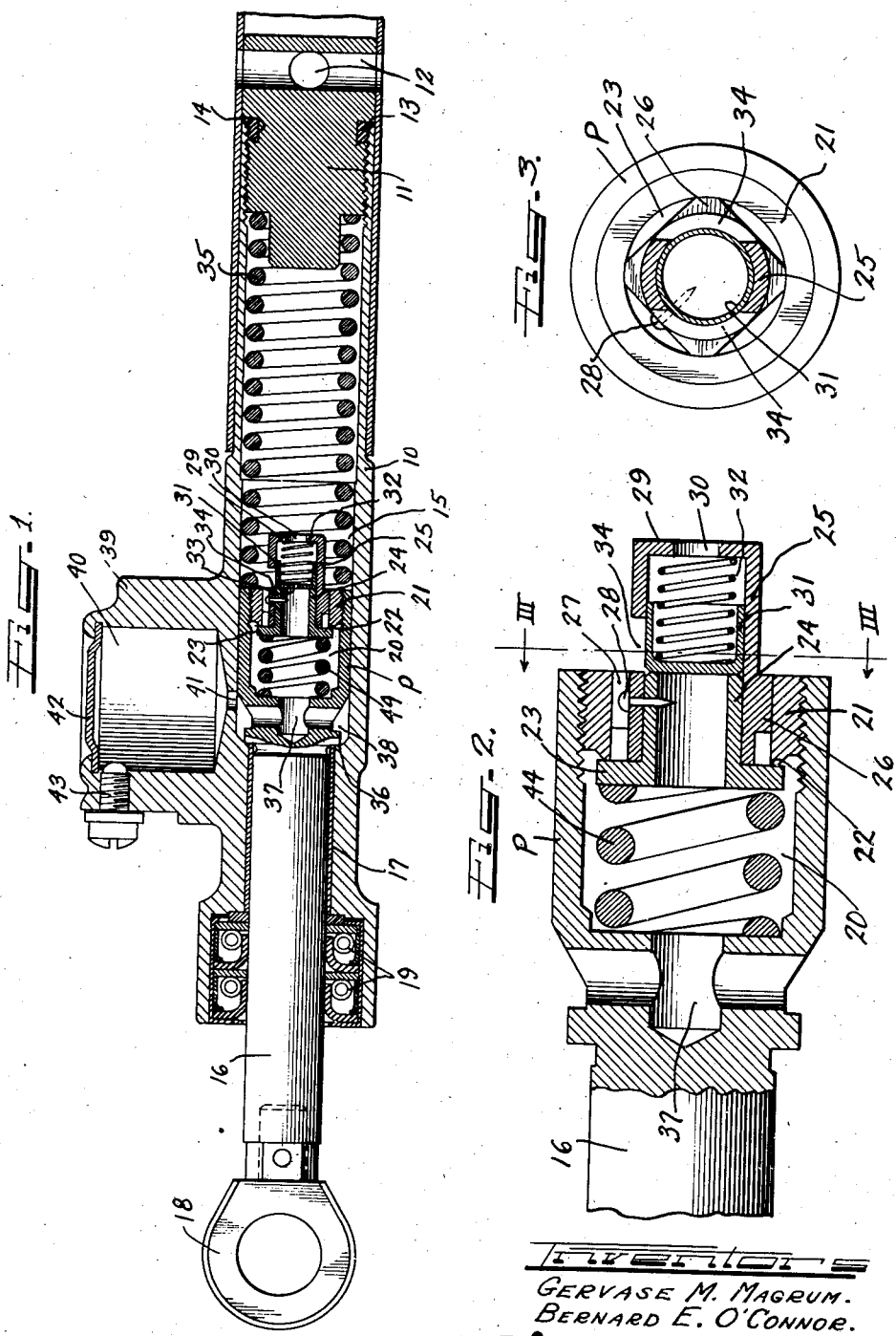
Inventors
GERVASE M. MAGRUM.
BERNARD E. O'CONNOR.

Patented Sept. 4, 1945

2,384,186

UNITED STATES PATENT OFFICE 2,384,186

HYDRAULIC SHOCK ABSORBER

Gervase M. Magrum and Bernard E. O'Connor, Buffalo, N. Y., assignors to Houdaille-Hershey Corporation, Detroit, Mich., a corporation of Michigan Application April 10, 1942, Serial No. 438,404

4 Claims. (Cl. 277—45)

This invention relates to hydraulic shock absorbers, particularly of the direct acting piston type such as disclosed in Magrum Patent No. 2,273,878, February 24, 1942, the important object being to provide improved valving means for controlling the flow of the displaced hydraulic fluid during operation of the shock absorber.

A shock absorber embodying the features of our invention is shown on the drawing, in which:

Figure 1 is a longitudinal diametral section of the shock absorber;

Figure 2 is an enlarged cross section of the valving assembly; and

Figure 3 is a section on plane III—III of Figure 2.

The shock absorber shown comprises the cylinder 10 internally threaded at one end to receive the plug 11 forming the cylinder head, the plug having openings or passages 12 by means of which it may be secured to a structure to be controlled by the shock absorber. Packing 13 compressed in a channel 14 in the plug seals this end of the cylinder against leakage.

The cylinder has the bore 15 in which the piston P operates, the piston rod 16 extending from the piston through the smaller bore 17 of the cylinder and has at its outer end an eye 18 or other suitable fitting for connection with structure to be controlled by the shock absorber. Packing 19 surrounds the piston rod and seals against fluid leakage.

The piston P has the chamber 20 threaded at its inner end to receive the annular valve seat member 21 which terminates in the annular seating edge 22 for the valve disk 23 which has the annular stem 24 extending therefrom into a sleeve 25. This sleeve has the flange 26 engaging in the seat member 21 and slabbed off to provide passageways 27. The sleeve is secured to the stem of the valve 23 as by means of a pin 28. The sleeve has the outer end wall 29 with a port 30 therethrough, and within the sleeve is the cup valve 31 normally held by a spring 32 seated with its bottom against the outer end of the valve stem 24. Figure 1 shows the bottom of the cup valve provided with a restricted orifice 33, and the sleeve has one or more ports 34 normally closed by the cup valve 31.

A spring 35 in the cylinder bore 15 abuts the plug 11 and the inner end of the piston and tends to hold the piston and its rod 16 in outer position and to resist inward movement thereof. The outward movement of the piston is limited by the engagement thereof with the shoulder 36.

The piston chamber 20 is connected by passages 37 in the piston head with the cylinder space 38 in front of the piston. The cylinder has the extension 39 providing an expansion chamber 40 communicating at its bottom through the passage 41 with the cylinder space 38. The chamber 40 is closed by a cover 42, and a filler plug 43 is provided for the chamber.

Within the piston chamber 20 is the spring 44 abutting the piston head and the valve disk 23 for resisting opening of the valve upon inward shift of the piston in the cylinder. This spring is comparatively heavy so as to resist full opening of the valve 23 for blow-off except under sudden or abnormal pressure conditions. In other words, full opening or blow-off of the valve should be delayed by the spring until there has been a maximum absorption by the shock absorber of the energy which it is to control. With such valve operation, the shock absorber can be efficiently utilized on machine or other guns for maximum absorption of the recoil before blow-off operation of the valve. Where the full benefit of the blow-off valve is desired, the orifice 33 in the cup valve 31 may be omitted, as shown on Figure 2, the only escape then of the fluid in the cylinder during inward travel of the piston being through the ports 21 and past the valve 23. Depending upon the energy exerted by the piston against the fluid in the outer end of the cylinder, the valve 23 will open to a corresponding degree for restricting the flow between the valve and the seating edge 22. Under sudden or prolonged inward movement of the piston under comparatively heavy pressure the built up fluid pressure will unseat the valve for blow-off flow through the piston.

In some installations of the shock absorber, the restricted orifice 33 may be desirable so that under ordinary inward movements of the piston the fluid can escape through the orifice, and the blow-off valve will operate only when the pressure of the displaced fluid becomes excessive or abnormal. When the shock absorber is relieved, the spring 35 will restore the piston to its outer position, and during such movement the cup valve will open against its comparatively light spring 32 for comparatively free flow of fluid through the piston. The spring 35 assists the valving structure in resisting and absorbing the inward movement of the piston in the cylinder.

The fluid displaced by the entrance of the piston rod into the cylinder will be received in the expansion chamber 40 to be returned to the cylinder when the piston is restored to its outer position.

We have shown a practical and efficient embodiment of the features of our invention, but we do not desire to be limited to the exact construction and arrangement shown and described, as changes and modifications may be made without departing from the scope of the invention.

We claim as follows:

1. A valving assembly for a hydraulic shock absorber comprising an annular valve seat member having an annular seating edge at its inner end, a sleeve extending through said seat member and having a flange thereon having sliding fit in said seat member, a valve disk for seating on said annular seating edge, an annular stem extending outwardly from said valve disk into the inner end of said sleeve and secured to said sleeve for movement of said sleeve with said valve, a comparatively heavy spring tending to hold said valve against said seating edge, said flange being slabbed off at opposite sides to leave passageway between said sleeve and said seating member for flow of fluid inwardly against said valve disk for opening thereof, a check valve in the outer end of said sleeve normally abutting the outer end of said stem for closing said stem against fluid flow inwardly therethrough and for opening said stem passageway for outward flow therethrough.

2. A valving assembly for a hydraulic shock absorber comprising an annular valve seat member having an annular seating edge at its inner end, a sleeve extending through said seat member and having a flange thereon having sliding fit in said seat member, a valve disk for seating on said annular seating edge, an annular stem extending outwardly from said valve disk into the inner end of said sleeve and secured to the sleeve whereby said sleeve will move with said valve disk, a comparatively heavy spring tending to hold said valve disk against said seating edge, said flange being slabbed off at opposite sides to leave passageway between said sleeve and said seating member for flow of fluid inwardly against said valve disk for opening thereof, the outer end of said sleeve forming a valve housing, ports connecting the interior of said housing with the exterior thereof, a check valve in said housing, a spring normally holding said check valve seated against the outer end of said stem for closure of said ports and said stem against inward flow therethrough, said check valve responding to outward flow pressure for opening of said stem passageway and said ports.

3. A valving assembly for a hydraulic shock absorber comprising an annular valve seat member having an annular seating edge at its inner end, a sleeve extending through said seat member and having a flange thereon having sliding fit in said seat member, a blow off valve for seating on said annular seating edge, a hollow stem extending from said blow off valve into the inner end of said sleeve and secured to the sleeve for movement of the sleeve with the blow off valve, a comparatively heavy spring tending to hold said blow off valve against said seating edge, said flange being slabbed off at opposite sides to leave passageway between said sleeve and said seating member for flow of fluid inwardly against said blow off valve for opening thereof, the outer end of said sleeve forming a housing having ports connecting the interior thereof with the exterior, a check valve within said housing and a comparatively light spring for normally holding said check valve to close said ports and to seat against the outer end of said stem whereby to prevent inward flow through said ports and said stem, said valve being unseated for outward flow through said stem and said ports.

4. A valving assembly for a hydraulic shock absorber comprising an annular seat member having an annular seating edge at its inner end, an annular valve stem structure movable axially in said seat member and having a guide flange thereon having sliding fit in said seat member, said valve stem structure terminating at its inner end in an annular blow off valve for seating against said seating edge, said guide flange being slabbed off at opposite sides to leave passageway between said stem structure and said seat member for inward flow tending to unseat said blow off valve, a comparatively heavy spring resisting unseating of said blow off valve, said stem structure having an extension on its outer end forming a valve housing having ports connecting the interior thereof with the exterior, a check valve in said housing and a light spring normally holding said check valve in position to close said ports and to seat against said stem structure to prevent inward flow through said ports and said stem structure, outward flow pressure unseating said valve for outward flow through said stem structure and said ports.

GERVASE M. MAGRUM.
BERNARD E. O'CONNOR.